United States Patent
Wang et al.

(10) Patent No.: US 12,201,961 B1
(45) Date of Patent: Jan. 21, 2025

(54) TARGETED AND LONG-LASTING PASSIVATION MATERIAL FOR SOIL CADMIUM IMMOBILIZATION, AND PREPARATION METHOD AND USE THEREOF

(71) Applicant: Institute of Soil Science, CAS, Nanjing (CN)

(72) Inventors: Xingxiang Wang, Nanjing (CN); Yurong Wang, Nanjing (CN); Changfeng Ding, Nanjing (CN); Liqin He, Nanjing (CN); Ziyao Li, Nanjing (CN)

(73) Assignee: Institute of Soil Science, CAS (CN)

( * ) Notice: Subject to any disclaimer, the term of this patent is extended or adjusted under 35 U.S.C. 154(b) by 0 days.

(21) Appl. No.: 18/441,579

(22) Filed: Feb. 14, 2024

(30) Foreign Application Priority Data

Nov. 8, 2023 (CN) .......................... 202311479606.3

(51) Int. Cl.
| | |
|---|---|
| *B01J 20/22* | (2006.01) |
| *B01J 20/04* | (2006.01) |
| *B01J 20/30* | (2006.01) |
| *B09C 1/08* | (2006.01) |
| *C09K 17/08* | (2006.01) |

(52) U.S. Cl.
CPC ............. *B01J 20/22* (2013.01); *B01J 20/043* (2013.01); *B01J 20/3021* (2013.01); *B01J 20/3071* (2013.01); *B01J 20/3085* (2013.01); *C09K 17/08* (2013.01); *B09C 1/08* (2013.01)

(58) Field of Classification Search
None
See application file for complete search history.

(56) References Cited

FOREIGN PATENT DOCUMENTS

| | | | | |
|---|---|---|---|---|
| CN | 103755714 A | * | 4/2014 | |
| CN | 107513240 A | * | 12/2017 | |
| CN | 108514870 A | * | 9/2018 | |
| CN | 108587079 A | * | 9/2018 | |
| CN | 108772070 A | * | 11/2018 | ............ B01J 23/007 |
| CN | 109499542 A | * | 3/2019 | |
| CN | 110918051 A | * | 3/2020 | |
| CN | 112625302 A | * | 4/2021 | |
| CN | 115672326 A | | 2/2023 | |
| WO | WO-2015083840 A1 | * | 6/2015 | .......... B01J 20/0229 |

OTHER PUBLICATIONS

First Office Action with English Translation for Chinese Application No. 202311479606.3, dated Apr. 12, 2024, 11 pages.
Notification of Grant with English Translation for Chinese Application No. 202311479606.3, dated May 20, 2024, 3 pages.
Pavlovic et al., "Adsorption of Cu2+, Cd2+ and Pb2+ ions by layered double hydroxides intercalated with the chelating agents diethylenetriaminepentaacetate and meso-2,3-dimercaptosuccinate," Applied Clay Science, 2009, pp. 125-129.

* cited by examiner

*Primary Examiner* — Joseph D Anthony
(74) *Attorney, Agent, or Firm* — Dickinson Wright PLLC (57) ABSTRACT

Disclosed are a targeted and long-lasting passivation material for soil cadmium immobilization, and a preparation method and use thereof. In the disclosure, the passivation material is a mercaptosuccinic acid-intercalated calcium iron aluminum hydrotalcite, which is prepared by hydrothermal co-precipitation of a metal salt dispersion and an intercalation solution in an alkaline environment.

12 Claims, 10 Drawing Sheets

TARGETED AND LONG-LASTING PASSIVATION MATERIAL FOR SOIL CADMIUM IMMOBILIZATION, AND PREPARATION METHOD AND USE THEREOF

CROSS REFERENCE TO RELATED APPLICATION

This patent application claims the benefit and priority of Chinese Patent Application No. 2023114796063 filed with the China National Intellectual Property Administration on Nov. 8, 2023, the disclosure of which is incorporated by reference herein in its entirety as part of the present application.

TECHNICAL FIELD

The present disclosure relates to the technical fields of material synthesis and heavy metal-contaminated soil remediation, and in particular to a targeted and long-lasting passivation material for soil cadmium immobilization, and a preparation method and use thereof.

BACKGROUND

Farmland soil plays a vital role in the healthy growth of crops and the production of high-quality agricultural products, and is directly related to the quality and safety of agricultural products and the health of soil ecosystem. According to data from the 2014 National Pollution Survey Bulletin, cadmium (Cd) polluted soils accounted for 7% of the sampled sites exceeding the standard in China, seriously threatening the quality and safety of agricultural products and public health.

In order to deal with heavy metal pollution, in-situ passivation technology is widely used in the safe utilization and remediation of heavy metal-contaminated farmland. Currently, commonly-used soil passivators include diatomaceous earth, sepiolite, hydroxyapatite, activated carbon, and hydrotalcite. Although most passivation materials show desirable effects in reducing the bioavailability of cadmium, a long-term application in large quantities or at high frequencies could easily lead to soil secondary constraints. Furthermore, most passivation materials typically alter the chemical form of heavy metals by adjusting soil pH, adsorption, and fixation, thereby reducing the bioavailability of heavy metals. However, this indiscriminate passivation process would also reduce the availability of beneficial micronutrients including iron, zinc, and manganese in soil.

In soil, water-soluble iron could directly promote the formation of iron plaque on paddy roots and block the cadmium uptake by root. Zinc could mainly inhibit the absorption of cadmium by paddy roots and reduce the transport of cadmium in the roots through competition and antagonism. At the same time, the zinc could also downregulate the expression of a root cadmium absorption gene OsIRT1. Manganese could reduce the expression of a root cadmium absorption gene OsNramp5 through gene regulation and promote the isolation of cadmium by an iron-manganese oxide plaque on the root surface, thus limiting the absorption of cadmium by paddy roots. However, when the common passivation materials are used to reduce soil cadmium bioavailability, they would also reduce the beneficial effects of iron, manganese, and zinc due to lack selectivity. A large number of studies have confirmed that on the basis of applying passivation materials, appropriate amounts of micro-fertilizers such as iron, manganese, and zinc are required during a critical growth period of paddy, which could better reduce the cadmium content in paddy grains. However, this process undoubtedly increases the cost and operational complexity of paddy production. In addition, under the conditions of soil acidification and periodic flooding and drainage in paddy production, cadmium immobilized by the passivation materials may be affected by hydrogen ions and active oxygen in the soil, and then is converted into bioavailable cadmium, which would seriously affect the long-lasting effectiveness of the immobilization. Thus, periodic and frequent application of the passivation materials is required to ensure the safe production of paddy. Therefore, there is an urgent need to develop a long-lasting passivation material that targets the reduction of soil available cadmium.

Hydrotalcite, also known as a layered double hydroxide precipitate, is a special passivation material. The hydrotalcite includes a main hydroxide layer composed of two or more metal elements and negatively-charged interlayer anions. In calcium-based hydrotalcite, main layer calcium ions and target cadmium ions are prone to isomorphous replacement, leading to the calcium-based hydrotalcite with a huge cadmium adsorption capacity. As a result, a hydrotalcite-like structure is formed, which has a certain acid stability owing to its extremely low solubility product. In addition, the hydrotalcite further exhibits adjustable layer elements and interlayer anions, which leads to diversified functions, thus exerting an application potential in various fields.

SUMMARY

In order to solve the above technical problems, the present disclosure provides a targeted and long-lasting passivation material for soil cadmium immobilization, and a preparation method and use thereof. In the present disclosure, the passivation material is a mercaptosuccinic acid-intercalated calcium iron aluminum hydrotalcite, which is prepared mainly by hydrothermal co-precipitation of a metal salt dispersion and an intercalation solution in an alkaline environment. The passivation material has a strong targeting ability for cadmium and is extremely less affected by other metal ions, which could reduce bioavailable cadmium content of cadmium-contaminated soil by 70%, but show a relatively low reduction rate of bioavailable iron, manganese and zinc in the soil. In a solution with a pH value of 4.5 under a simulated acidic soil environment, the passivation material has a dissolution rate of only 2.05% of cadmium adsorption products and shows strong stability of cadmium fixation. The passivation material could stably maintain an immobilization rate of approximately 70% in a 40-day periodic flooding and drainage environment. Therefore, the passivation material of the present disclosure has an excellent selectivity and a long-lasting passivation effect, and is suitable for in-situ remediation of the cadmium-contaminated soil, thus exhibiting broad application prospects in the field of heavy metal-contaminated farmland remediation and safe production.

To achieve the above objects, the present disclosure provides the following technical solutions:

Provided is a method for preparing a targeted and long-lasting passivation material for soil cadmium immobilization, including steps of:

(1) preparing a metal salt dispersion A, a precipitant solution B, and an intercalation solution C; where the metal salt dispersion A includes (or consists of) a divalent metal salt dispersion and a trivalent metal salt dispersion, the precipitant solution B is a sodium hydroxide solution, and the intercalation solution C is a mercaptosuccinic acid solution; and the divalent metal salt dispersion, the trivalent metal salt dispersion, the sodium hydroxide solution, and the mercaptosuccinic acid solution each are prepared with carbon dioxide-free water;

(2) adding the metal salt dispersion A in a container, constantly introducing nitrogen (N2) into the container, and subjecting the metal dispersion A to water bath heating at a temperature of 65° C.±5° C. under magnetic stirring at a speed of 150 r/min to 240 r/min at the same time;

(3) pumping the precipitant solution B and the intercalation solution C into the container at a controlled pumping speed to form a mixed system, and monitoring a pH value of the mixed system in real time such that the pH value is in a range of 10.5±0.5 during the pumping;

(4) subjecting the mixed system to hydrothermal stirring for 6 h to 8 h, and then subjecting a resulting system to aging to obtain an aged system; and (5) subjecting the aged system to solid-liquid separation, washing an obtained solid phase until a resulting effluent is neutral, and then drying and grinding a resulting washed solid phase to obtain a mercaptosuccinic acid-intercalated calcium iron aluminum hydrotalcite.

In some embodiments, in step (1), the divalent metal salt dispersion is a solution containing divalent calcium salts and/or divalent iron salts, and the trivalent metal salt dispersion is a solution containing trivalent iron salts and/or trivalent aluminum salts; a molar ratio of a divalent metal to a trivalent metal in the metal salt dispersion A is in a range of 1:1 to 4:1; and a metal salt in the metal salt dispersion A is any one selected from the group consisting of a nitrate, a chloride, and a sulfate.

In some embodiments, in step (1), the precipitant solution B has a concentration of 0.50 mol/L to 1.70 mol/L.

In some embodiments, in step (1), the intercalation solution C has a concentration of 0.025 mol/L to 0.50 mol/L.

In some embodiments, in step (2), the water bath heating is conducted at a temperature of 65° C.±2° C., and the magnetic stirring is conducted at a speed of 180 r/min.

In some embodiments, in step (3), the precipitant solution B is pumped at a pumping speed of 1.0 mL/min to 3.0 mL/min, and the intercalation solution C is pumped at a pumping speed of 0.5 mL/min to 2.0 mL/min.

In some embodiments, in step (4), the aging is conducted at ambient temperature for 8 h to 12 h.

In some embodiments, in step (5), the washing is conducted alternately with deionized water and absolute ethanol; and the drying is conducted at a temperature of 35° C. to 45° C.

Further provided is a targeted and long-lasting passivation material for soil cadmium immobilization prepared by the method described above, where the targeted and long-lasting passivation material for soil cadmium immobilization is the mercaptosuccinic acid-intercalated calcium iron aluminum hydrotalcite.

Further provided is use of the mercaptosuccinic acid-intercalated calcium iron aluminum hydrotalcite as a targeted and long-lasting passivation material for soil cadmium immobilization. In some embodiments, the mercaptosuccinic acid-intercalated calcium iron aluminum hydrotalcite could be applied in the removal of heavy metals from cadmium-contaminated farmland soil and the long-term passivation remediation of the cadmium-contaminated farmland soil.

In the present disclosure, cadmium is removed by the mercaptosuccinic acid-intercalated calcium iron aluminum hydrotalcite mainly through various mechanisms such as adsorption, precipitation, displacement, and complexation. The hydrotalcite has a large specific surface area and complex pore structure, allowing it to adsorb a variety of ions in soil solutions. Further, hydroxyl structure on an outer surface main layer of the hydrotalcite could adjust the pH value of the solution, helping to convert ions into hydroxide precipitation, during which, calcium on the main layer could be replaced, and calcium vacancies that could be occupied by cadmium would be formed. As a result, cadmium could be fixed on the main layer, making it possible to form a highly-stable hydrotalcite-like structure containing cadmium, which has a solubility product much lower than that of the corresponding hydroxide or carbonate, and shows strong acid resistance. Iron, manganese, and zinc, which are significantly different in size from calcium ions, enter into the main layer with a lower priority than cadmium. In addition, thiol functional groups intercalated inside the hydrotalcite could form complexes with the cadmium ions, and these complexes remain stable in a wide range of pH values. Moreover, according to the hard and soft acid and base concept (HSAB), mercapto groups lack affinity for hard acids (such as iron and manganese) and have relatively low affinity for boundary acids (such as zinc). Accordingly, under complex environmental conditions, the mercaptosuccinic acid-intercalated calcium iron aluminum hydrotalcite could capture and fix cadmium in a targeted manner, and a resulting product thereof also exhibits superior acid resistance, thus achieving targeted and long-lasting immobilization of the cadmium.

Compared with the prior technology, some embodiments of the present disclosure have the following beneficial effects:

In the present disclosure, the targeted and long-lasting passivation material is a mercaptosuccinic acid-intercalated calcium iron aluminum hydrotalcite, which could significantly reduce the bioavailability of cadmium in soil, but show little impact on the bioavailability of beneficial trace elements such as iron, manganese, and zinc; thus, targeted passivation of the cadmium in soil could be achieved. The targeted and long-lasting passivation material for soil cadmium immobilization has a targeted adsorption capacity for cadmium that is less affected by other coexisting metal ions, and a cadmium removal efficiency of not less than 99% could be maintained in soil solutions where multiple metal ions (Na, K, Ca, Mg, Al, Fe, Zn, and Mn) coexist. When the targeted and long-lasting passivation material for soil cadmium immobilization is used to passivate cadmium-contaminated soil, bioavailable cadmium could be reduced by 70%, which is equivalent to that of lime; however, a reduction rate of bioavailable iron, manganese, and zinc by the targeted and long-lasting passivation material for soil cadmium immobilization is only 2/7, 5/7 and ½ those of lime, respectively. In a solution simulating an acidic soil environment (pH=4.5), Cd adsorbed by the intercalated material has a dissolution rate of only 2.05%, which is lower than a 10.2% dissolution rate by unintercalated hydrotalcite and much lower than a 42.59% dissolution rate by commercial hydrotalcite. In addition, in a 40-day periodic flooding and drainage environment, a cadmium passivation efficiency of lime and the commercial hydrotalcite is dropped from 70% to 50%-60%, while an immobilization efficiency of the targeted and long-lasting passivation material for soil cadmium immobilization could be stably maintained at around 70%. Therefore, the targeted and long-lasting passivation material for soil cadmium immobilization prepared by the present disclosure has an excellent selectivity and a long-lasting passivation effect, and is suitable for in-situ remediation of the cadmium-contaminated soil, thus exhibiting broad application prospects in the field of heavy metal-contaminated farmland remediation and safe production.

DETAILED DESCRIPTION OF THE EMBODIMENTS

The following examples are intended to illustrate the present disclosure, but not to limit the scope of the present disclosure. Modifications or substitutions made to methods, procedures, conditions, instruments, or reagents of the present disclosure without departing from the spirit and essence of the present disclosure would fall within the scope of the present disclosure.

The technical solution of the present disclosure will be further described in detail below with reference to examples.

Example 1 Preparation of Solid Powder of Mercaptosuccinic Acid-Intercalated Calcium Iron Aluminum Hydrotalcite by Using Nitrate 11.81 g of $Ca(NO_3)_2 \cdot 4H_2O$, 5.05 g of $Fe(NO_3)_3 \cdot 9H_2O$, and 4.69 g of $Al(NO_3)_3 \cdot 9H_2O$ were dissolved in 100 mL of carbon dioxide-free water to obtain a solution A. 6.80 g of NaOH was dissolved in 100 mL of carbon dioxide-free water to obtain a solution B. 3.75 g of mercaptosuccinic acid (purchased from Shanghai Macklin Biochemical Co., Ltd., China, product number 70-49-5) was dissolved in 100 mL of carbon dioxide-free water to obtain a solution C. The solution B and the solution C were added dropwise into the solution A through a peristaltic pump, and a pH value of a resulting mixed system was maintained at 10.5±0.5. In a nitrogen atmosphere, the mixed system was subjected to magnetic stirring in a water bath at 65° C. for 8 h and then aged for 12 h. An obtained mixed slurry was subjected to solid-liquid separation, and an obtained solid was washed alternately with ethanol and deionized water multiple times. Then the washed solid was dried at 45° C. for 8 h, and ground to obtain the solid powder of the mercaptosuccinic acid-intercalated calcium iron aluminum hydrotalcite.

Example 2 Preparation of Solid Powder of Mercaptosuccinic Acid-Intercalated Calcium Iron Aluminum Hydrotalcite by Using Chloride 2.77 g of $CaCl_2$, 3.17 g of $FeCl_2$, and 3.33 g of $AlCl_3$ were dissolved in 100 mL of carbon dioxide-free water to obtain a solution A. 6.80 g of NaOH was dissolved in 100 mL of carbon dioxide-free water to obtain a solution B. 3.75 g of mercaptosuccinic acid (purchased from Shanghai Macklin Biochemical Co., Ltd., China, product number 70-49-5) was dissolved in 100 mL of carbon dioxide-free water to obtain a solution C. The solution B and the solution C were added dropwise into the solution A through a peristaltic pump, and a pH value of a resulting mixed system was maintained at 10.5±0.5. In a nitrogen atmosphere, the mixed system was subjected to magnetic stirring in a water bath at 65° C. for 8 h and then aged for 12 h. An obtained mixed slurry was subjected to solid-liquid separation, and an obtained solid was washed alternately with ethanol and deionized water multiple times. Then, the washed solid was dried at 45° C. for 8 h, and then ground to obtain the solid powder of the mercaptosuccinic acid-intercalated calcium iron aluminum hydrotalcite.

Figure 1A:
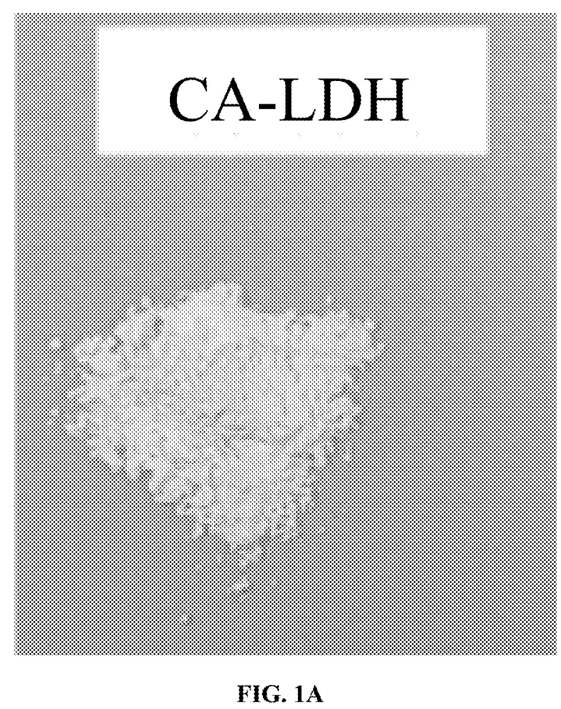
FIG. 1A shows a solid powder of a calcium aluminum hydrotalcite.
Figure 1B:
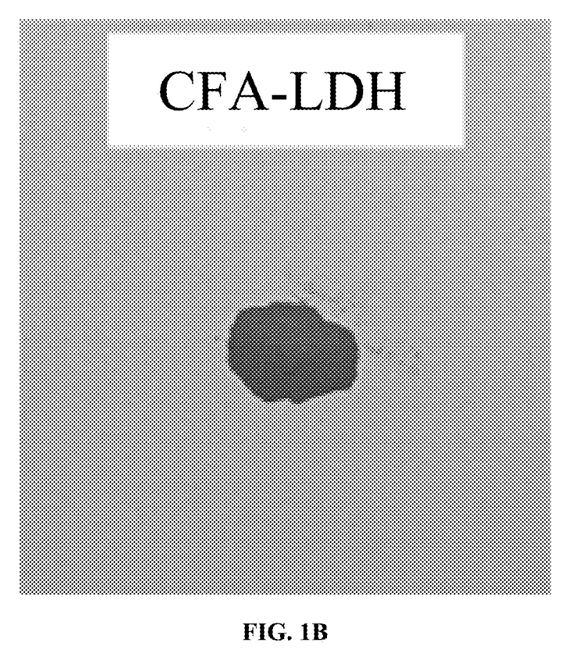
FIG. 1B shows a solid powder of a calcium iron aluminum hydrotalcite.
Figure 1C:
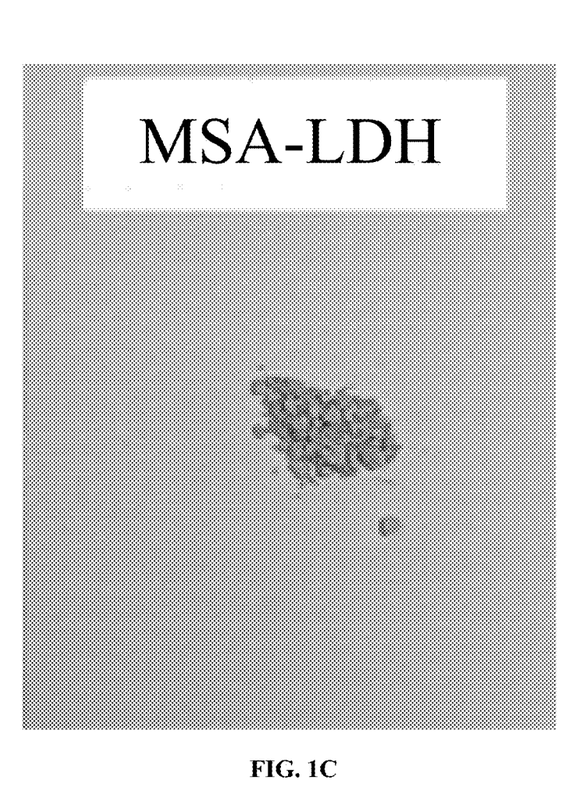
FIG. 1C shows a solid powder of the mercaptosuccinic acid-intercalated calcium iron aluminum hydrotalcite as prepared in Example 2 of the present disclosure.

FIG. 1A shows a solid powder of a calcium aluminum hydrotalcite; FIG. 1B shows a solid powder of a calcium iron aluminum hydrotalcite; and FIG. 1C shows a solid powder of the mercaptosuccinic acid-intercalated calcium iron aluminum hydrotalcite as prepared in Example 2.

Figure 2:
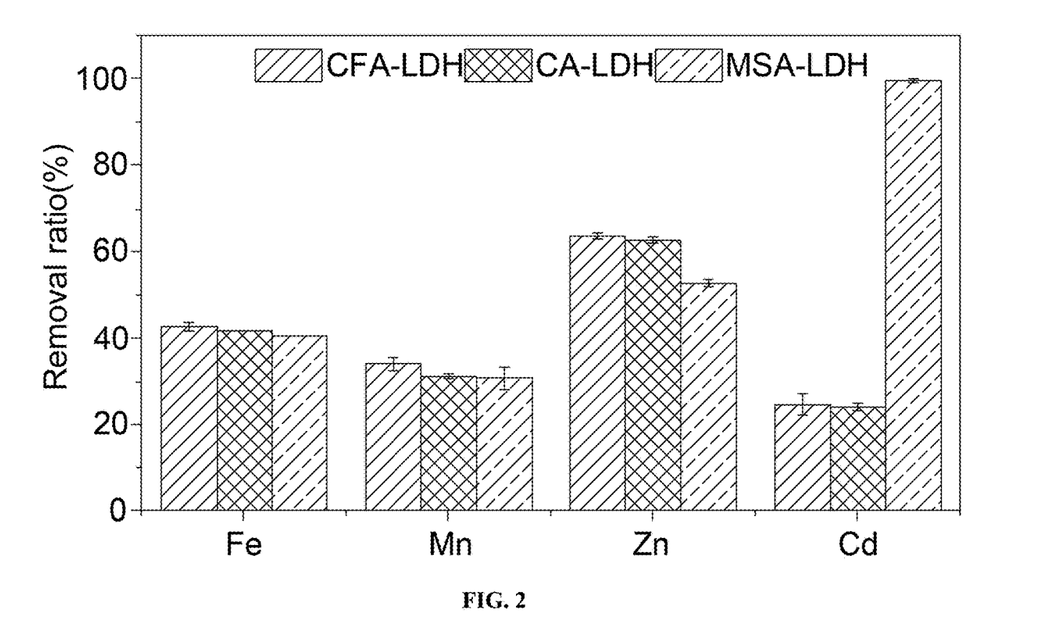
FIG. 2 shows removal efficiencies of heavy metal ions in a soil extraction liquid by different hydrotalcite materials as prepared in Example 3 of the present disclosure.
Figure 3A:
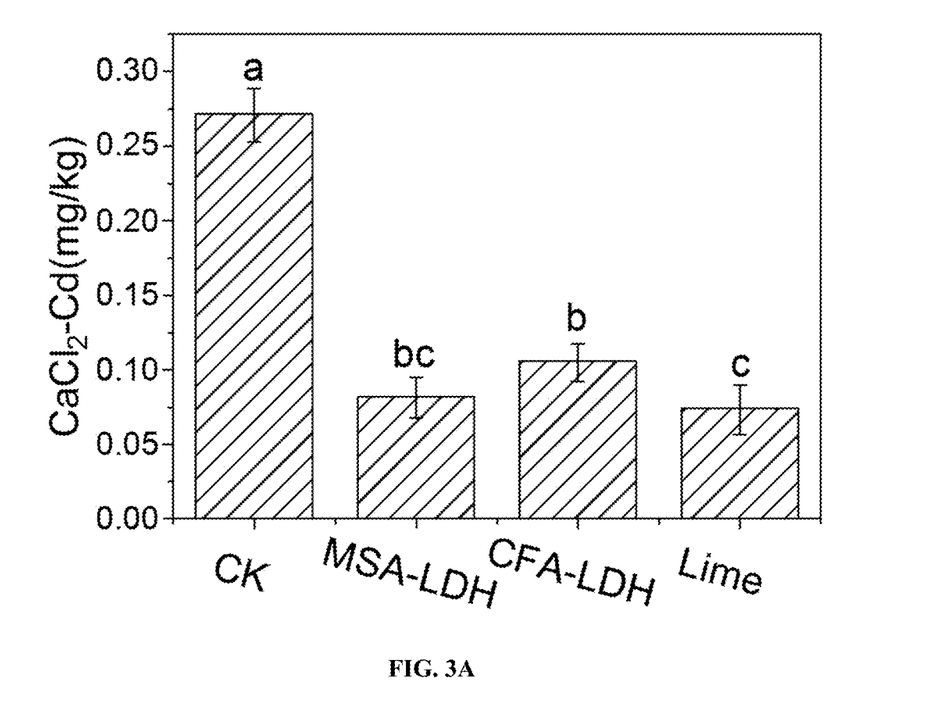
FIG. 3A shows immobilization effects of Cd by different hydrotalcite materials as prepared in Example 4 of the present disclosure on cadmium-contaminated paddy soil.
Figure 3B:
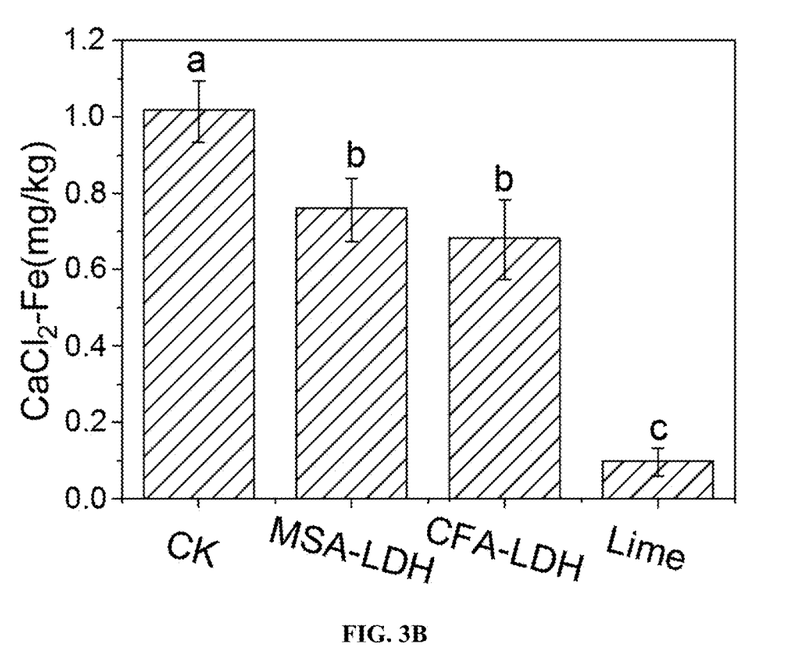
FIG. 3B shows immobilization effects of Fe by different hydrotalcite materials as prepared in Example 4 of the present disclosure on cadmium-contaminated paddy soil.
Figure 3C:
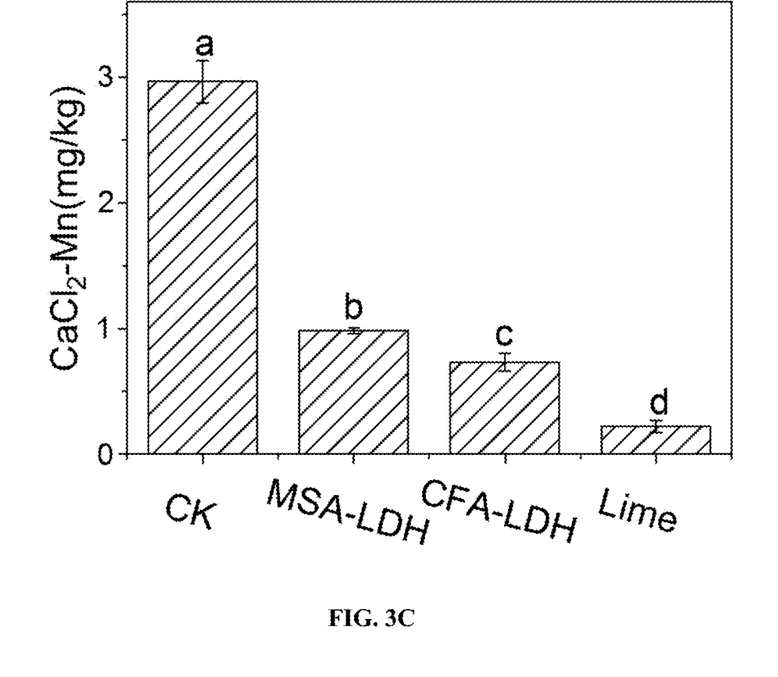
FIG. 3C shows immobilization effects of Mn by different hydrotalcite materials as prepared in Example 4 of the present disclosure on cadmium-contaminated paddy soil.
Figure 3D:
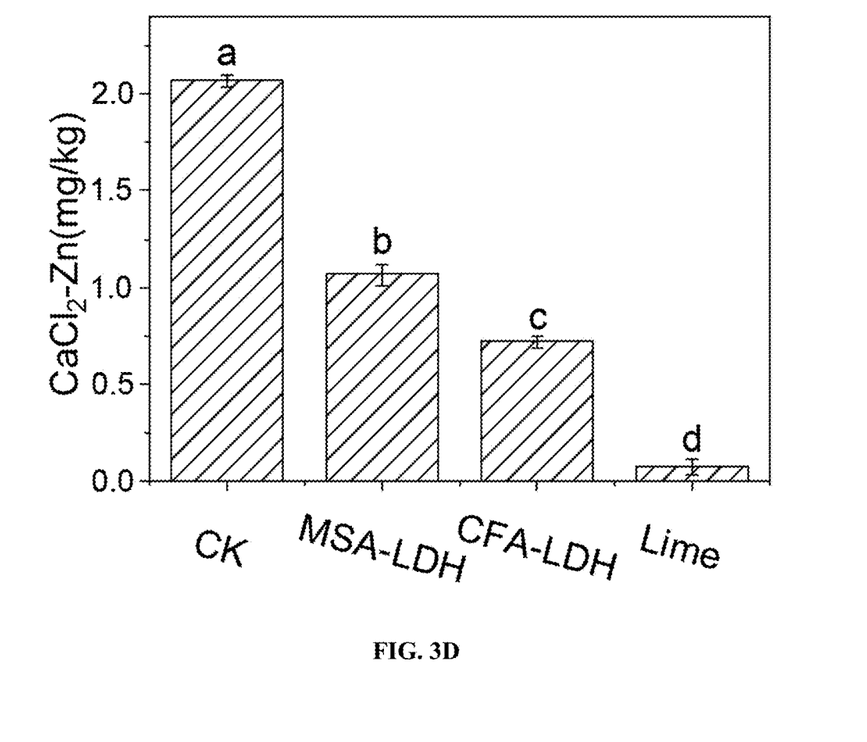
FIG. 3D shows immobilization effects of Zn by different hydrotalcite materials as prepared in Example 4 of the present disclosure on cadmium-contaminated paddy soil.

Example 3 Removal Effect of the Mercaptosuccinic Acid-Intercalated Calcium Iron Aluminum Hydrotalcite on Heavy Metals in Soil Extraction Liquid Cadmium-contaminated paddy soil (cadmium content: 2.77 mg/kg) was collected from Guixi City, Jiangxi Province, China, and extracted with deionized water for 24 h under shaking (a water-to-soil ratio was maintained at 1:2), and then subjected to centrifugation and filtration, to obtain a soil extraction liquid. The specific ion concentrations are shown in Table 1. The mercaptosuccinic acid-intercalated calcium iron aluminum hydrotalcite (MSA-LDH) as prepared in Example 1, the unintercalated calcium iron aluminum hydrotalcite (CFA-LDH), and the reported calcium iron aluminum hydrotalcite (CA-LDH) were added separately into the soil extraction liquid at a solid-to-liquid ratio of 0.05 g/L, and shaken at room temperature for 24 h, and a remaining cadmium concentration in the soil extraction liquid was determined after treatment. The results are shown in FIG. 2.

Where, the unintercalated calcium iron aluminum hydrotalcite (CFA-LDH) was prepared according to the method of Example 1, except that mercaptosuccinic acid was not added. The calcium aluminum hydrotalcite (CA-LDH) was derived from the report of Chemical Engineering Journal 407 (2021) 127178.

TABLE 1

Composition of the soil extraction liquid

| Type of cations | Cd | K | Na | Ca | Mg | Al | Fe | Zn | Mn |
|---|---|---|---|---|---|---|---|---|---|
| Concentration mg/L | 0.1 | 6.8 | 5.6 | 12.5 | 2.6 | 3.4 | 2.0 | 0.3 | 0.2 |

| Type of anions | $SO_4^{2-}$ | $Cl^-$ | $NO_3^-$ |
|---|---|---|---|
| Concentration mg/L | 95.7 | 44.0 | 1.2 |

Comparing the removal efficiencies of each ion in FIG. 2, it can be seen that the mercaptosuccinic acid-intercalated calcium iron aluminum hydrotalcite as prepared in the present disclosure has a removal efficiency on cadmium of up to 99.2% in a complex environment, which is 4 times that of the unintercalated calcium iron aluminum hydrotalcite (CFA-LDH) and the calcium aluminum hydrotalcite (CA-LDH). At the same time, the removal effect of the mercaptosuccinic acid-intercalated calcium iron aluminum hydrotalcite (MSA-LDH) on iron, manganese, and zinc is weaker than that of the unintercalated hydrotalcite (CFA-LDH) and the reported calcium aluminum hydrotalcite (CA-LDH). This reflects that the intercalated hydrotalcite allows for target adsorption and removal of cadmium in complex soil solutions.

Example 4 Soil Immobilization Effect of the Mercaptosuccinic Acid-Intercalated Calcium Iron Aluminum Hydrotalcite Cadmium-contaminated paddy soil samples HS were collected in Guixi City, Jiangxi Province, China. The basic physical and chemical properties were: pH=5.34, total Cd 1.49 mg/kg. The mercaptosuccinic acid-intercalated calcium iron aluminum hydrotalcite (MSA-LDH) as prepared in Example 1, the unintercalated calcium iron aluminum hydrotalcite (CFA-LDH) as prepared in Example 3, and lime alone (purchased from Guixi City, Jiangxi Province, China) were used as a passivator separately at 0.2% dosage to conduct soil incubation experiments, where soil moisture was maintained at 80% of water holding capacity of the field. After 14 days, the bioavailable cadmium, iron, manganese, and zinc in the soil were extracted by 0.01 M $CaCl_2$) solution and measured by ICP-MS. The experimental results are shown in FIG. 3A to FIG. 3D.

The results show that in the paddy soil HS, the calcium iron aluminum hydrotalcite (CFA-LDH), mercaptosuccinic acid-intercalated calcium iron aluminum hydrotalcite (MSA-LDH), and lime alone (Lime) all show desirable cadmium immobilization effect, and the cadmium immobilization rates all were higher than 70%. However, regarding the reduction rate of available iron, manganese, and zinc, the mercaptosuccinic acid-intercalated calcium iron aluminum hydrotalcite (MSA-LDH) is relatively mild, only ⅔, ⅗, and ½ that of lime.

Figure 4:
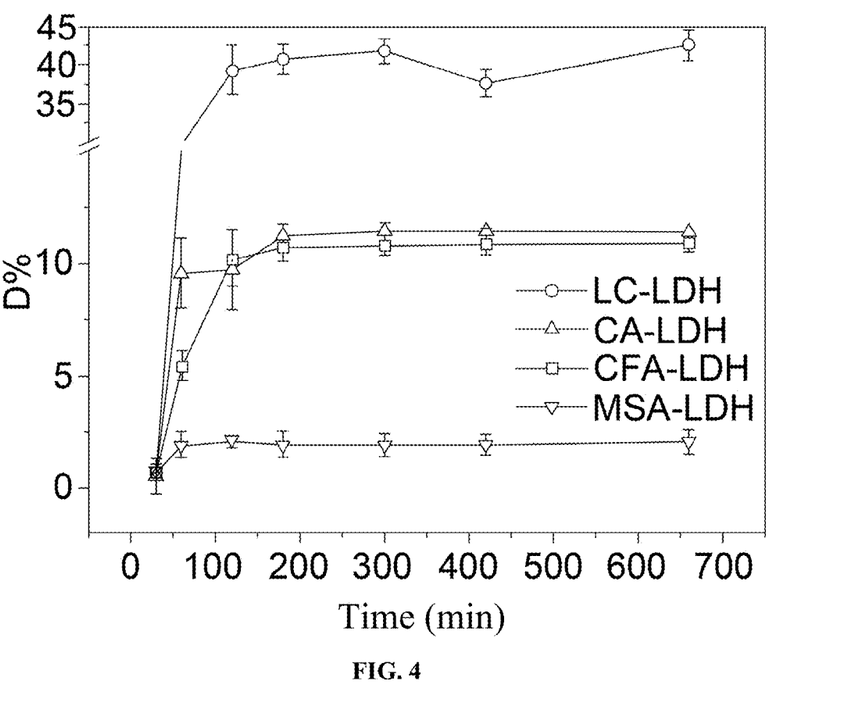
FIG. 4 shows acid dissolution rates of cadmium adsorbed by different materials as prepared in Example 5 of the present disclosure.

Example 5 Dissolution of Cadmium from Cadmium Adsorption Products of the Mercaptosuccinic Acid-Intercalated Calcium Iron Aluminum Hydrotalcite in Simulated Acidic Environment 0.06 g each of the different passivation materials in Example 3 was added into a 50 mL centrifuge tube, and then 30 mL of a 120 mg/L cadmium solution was added. A resulting mixture was subjected to adsorption under shaking for 24 h. The cadmium concentrations ($C_0$, $C_e$) of the solution before and after the adsorption were measured. An adsorption capacity $q_e$ was calculated by equation [1]. After each adsorption reached equilibrium, resulting products were subjected to solid-liquid separation, and obtained solids were put into 300 mL of an acidic solution with pH=4.5, which simulates an acidic soil environment, followed by magnetic stirring for 30 min, 60 min, 120 min, 180 min, 300 min, 420 min, and 660 min. Then, samples of the supernatant were collected, and the cadmium contents ($C_1$, $C_2$) in the solution before and after dissolution were measured, and a dissolution amount $R_e$ was calculated according to equation [2], where m represented a mass of the passivation materials added, and $V_1$ and $V_2$ represented a volume of the cadmium solution and a volume of the acidic solution, respectively. According to a ratio of the dissolution amount $R_e$ and the adsorption capacity $q_e$, a dissolution rate D % was calculated using equation [3]. The results are shown in FIG. 4.

$$q_e = \frac{(c_0 - c_e) \times v_1}{m} \quad [1]$$

$$R_e = \frac{(c_1 - c_2) \times v_2}{m} \quad [2]$$

$$D\% = R_e/q_e \quad [3]$$

Comparing the dissolution rates, it can be found that the cadmium adsorption product of the mercaptosuccinic acid-intercalated calcium iron aluminum hydrotalcite (MSA-LDH) has a cadmium dissolution rate of only 2.05% at pH=4.5, which is lower than 10.86% and 11.35% of the unintercalated calcium iron aluminum hydrotalcite (CFA-LDH) and the reported calcium aluminum hydrotalcite (CA-LDH), and is much lower than 42.59% of the commercial hydrotalcite (LC-LDH).

Figure 5:
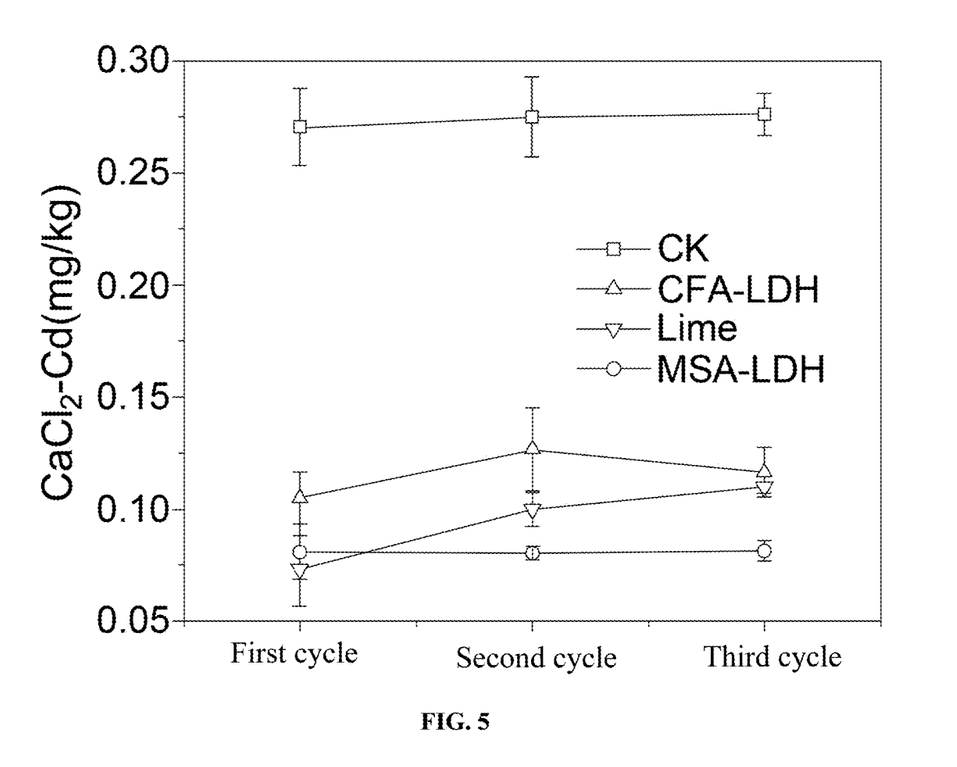
FIG. 5 shows immobilization effects of cadmium by different materials as prepared in Example 6 of the present disclosure under periodic flooding and drainage conditions.

Example 6 Stabilizing Effect of Cadmium Passivation in Mixed System of Soil and the Passivation Material Under Periodic Flooding and Drainage Environment The mixed system that had reached equilibrium in Example 5 was subjected to periodic flooding for 7 days and drainage for 7 days. After each period, the bioavailable cadmium was extracted using 0.01 M $CaCl_2$) solution. FIG. 5 shows the changes in the bioavailable Cd concentration after the end of different period cycles.

As shown in FIG. 5, in periodic flooding and drainage, the immobilization effect of lime (Lime) reduced from 70.9% to 60.3%, and the cadmium immobilization rate of the unintercalated calcium iron aluminum hydrotalcite (CFA-LDH) reduced from 67.8% to 50.2%. However, the cadmium passivation rate of the mercaptosuccinic acid-intercalated calcium iron aluminum hydrotalcite (MSA-LDH) was stably maintained at approximately 70%. Therefore, the mercaptosuccinic acid-intercalated calcium iron aluminum hydrotalcite could maintain low concentration of available cadmium for a long time, showing a long-lasting immobilization effect.

The above examples are only intended to describe the preferred embodiments of the present disclosure, but not to limit the scope of the present disclosure. Various alterations and improvements made by those skilled in the art based on the technical solution of the present disclosure without departing from the design spirit of the present disclosure shall fall within the scope of the claims of the present disclosure.

What is claimed is:

1. A method for preparing a targeted and long-lasting passivation material for soil cadmium, comprising steps of:
   (1) preparing a metal salt dispersion A, a precipitant solution B, and an intercalation solution C; wherein the metal salt dispersion A comprises a divalent metal salt dispersion and a trivalent metal salt dispersion, the precipitant solution B is a sodium hydroxide solution, and the intercalation solution C is a mercaptosuccinic acid solution; and the divalent metal salt dispersion, the trivalent metal salt dispersion, the sodium hydroxide solution, and the mercaptosuccinic acid solution each are prepared with carbon dioxide-free water;
   wherein the divalent metal salt dispersion is a solution of calcium salts, and the trivalent metal salt dispersion is a solution of iron salts and aluminum salts; the molar ratio of the calcium salts, the iron salts and the aluminum salts in the metal salt dispersion A is 4:1:1; and the metal salt in the metal salt dispersion A is any one selected from the group consisting of a nitrate, a chloride, and a sulfate; and
   the mercaptosuccinic acid solution has a concentration of 0.025 mol/L to 0.50 mol/L;
   (2) adding the metal salt dispersion A in a container, constantly introducing nitrogen into the container, and subjecting the metal salt dispersion A to water bath heating at a temperature of 65° C.±5° C. under magnetic stirring at a speed of 150 r/min to 240 r/min at the same time;
   (3) pumping the precipitant solution B and the intercalation solution C into the container at a controlled pumping speed to form a mixed system, and monitoring a pH value of the mixed system in real time such that the pH value is in a range of 10.5±0.5 during the pumping;
   (4) subjecting the mixed system to hydrothermal stirring for 6 h to 8 h, and then subjecting a resulting system to aging to obtain an aged system; and
   (5) subjecting the aged system to solid-liquid separation, washing an obtained solid phase until a resulting effluent is neutral, and then drying and grinding a resulting washed solid phase to obtain a mercaptosuccinic acid-intercalated calcium iron aluminum hydrotalcite.

2. The method of claim 1, wherein in step (1), the precipitant solution B has a concentration of 0.50 mol/L to 1.70 mol/L.

3. The method of claim 2, wherein in step (2), the water bath heating is conducted at a temperature of 65° C.±2° C., and the magnetic stirring is conducted at a speed of 180 r/min.

4. The method of claim 3, wherein in step (3), the precipitant solution B is pumped at a pumping speed of 1.0 mL/min to 3.0 mL/min, and the intercalation solution C is pumped at a pumping speed of 0.5 mL/min to 2.0 mL/min.

5. The method of claim 4, wherein in step (4), the aging is conducted at ambient temperature for 8 h to 12 h.

6. The method of claim 5, wherein in step (5), the washing is conducted alternately with deionized water and absolute ethanol; and the drying is conducted at a temperature of 35° C. to 45° C.

7. A targeted and long-lasting passivation material for soil cadmium prepared by the method of claim 1, wherein the targeted and long-lasting passivation material for soil cadmium is the mercaptosuccinic acid-intercalated calcium iron aluminum hydrotalcite.

8. A targeted and long-lasting passivation material for soil cadmium prepared by the method of claim 2, wherein the targeted and long-lasting passivation material for soil cadmium is the mercaptosuccinic acid-intercalated calcium iron aluminum hydrotalcite.

9. A targeted and long-lasting passivation material for soil cadmium prepared by the method of claim 3, wherein the targeted and long-lasting passivation material for soil cadmium is the mercaptosuccinic acid-intercalated calcium iron aluminum hydrotalcite.

10. A targeted and long-lasting passivation material for soil cadmium prepared by the method of claim 4, wherein the targeted and long-lasting passivation material for soil cadmium is the mercaptosuccinic acid-intercalated calcium iron aluminum hydrotalcite.

11. A targeted and long-lasting passivation material for soil cadmium prepared by the method of claim 5, wherein the targeted and long-lasting passivation material for soil cadmium is the mercaptosuccinic acid-intercalated calcium iron aluminum hydrotalcite.

12. A targeted and long-lasting passivation material for soil cadmium prepared by the method of claim 6, wherein the targeted and long-lasting passivation material for soil cadmium is the mercaptosuccinic acid-intercalated calcium iron aluminum hydrotalcite.

* * * * *